Oct. 12, 1948.  R. V. MARTIN  2,451,399
RAIN GUTTER FOR AUTOMOBILE WINDOWS
Filed Oct. 3, 1945
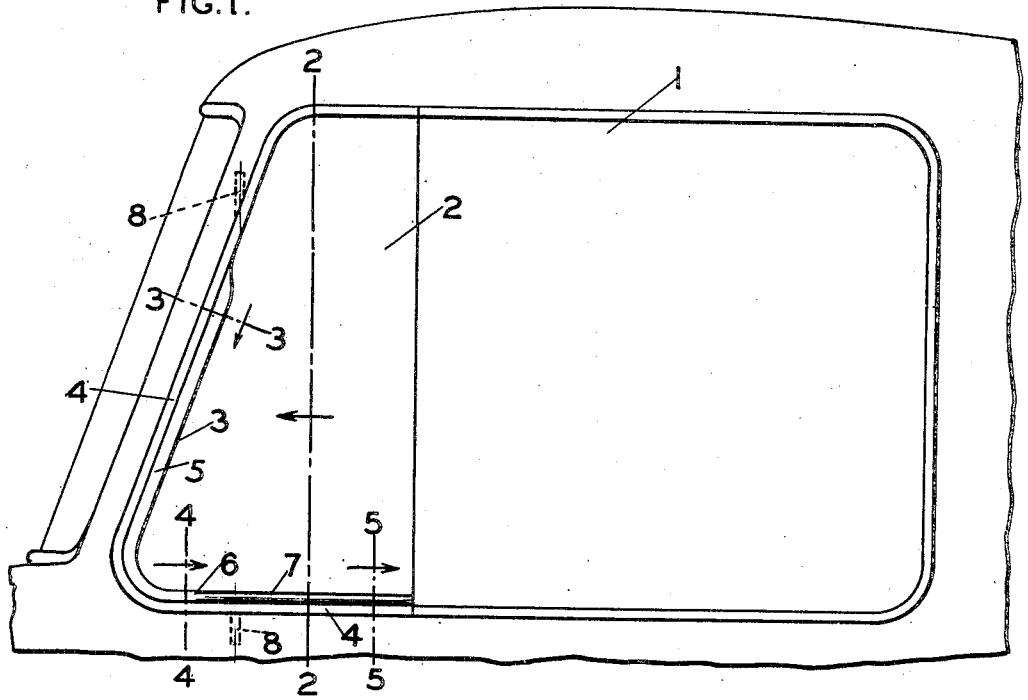
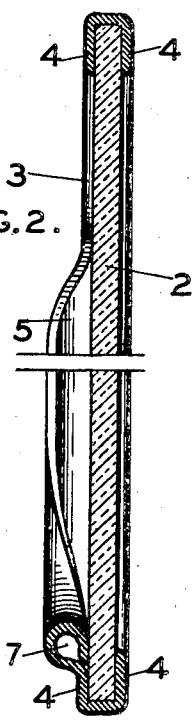
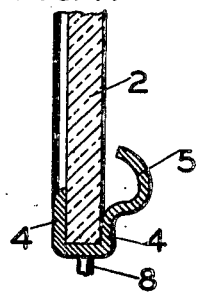
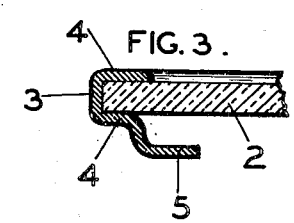
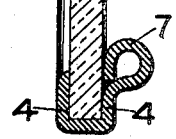
Inventor
RALPH V. MARTIN Patented Oct. 12, 1948

2,451,399

UNITED STATES PATENT OFFICE 2,451,399

RAIN GUTTER FOR AUTOMOBILE WINDOWS

Ralph V. Martin, Philadelphia, Pa.

Application October 3, 1945, Serial No. 620,081

1 Claim. (Cl. 296—44)

This invention relates to rain gutters for automobile windows and more particularly to a rain gutter for the small vertically pivoted ventilator windows now generally in use in association with the front, or driver's windows of cars.

An object of the invention is to provide an improved rain gutter for windows of this type which will intercept and effectively divert rain impinging on the open window outside of the car.

Further objects will more particularly appear in the course of the following detailed description.

The invention consists in the novel construction, arrangement and combinations of parts hereinafter more particularly described and claimed.

One sheet of drawings accompanies this application as part thereof.

In the drawings:

Fig. 1 is a fragmentary side elevation of the front window of an automobile showing the present invention applied.

Fig. 2 is a vertical transverse cross section taken on line 2—2 of Fig. 1.

Fig. 3 is a fragmentary cross section taken on line 3—3 of Fig. 1.

Fig. 4 is a fragmentary vertical cross section taken on line 4—4 of Fig. 1.

Fig. 5 is a fragmentary vertical cross section taken on line 5—5 of Fig. 1.

The great popularity of the vertically pivoted ventilator windows in connection with which the present invention is intended to be used lies in the fact that when the windows are opened, on their vertical axis, air is drawn into the car over the forward and inner edge of the window, while at the same time, air is expelled from the interior of the car through the opening between the rear edge of the ventilator window and the front edge of the usual side window. This circulation of air while highly desirable for the proper ventilation of the car and entirely satisfactory during good weather, offers serious problems when it is raining inasmuch as water impinging on the ventilator window is drawn into the car by the air being forced into the car over the forward edge of the window with such force that ordinary gutter devices positioned on this forward edge are ineffective.

The present invention provides a simple gutter device capable of utilizing the Venturi-like forces developed by the position of the open ventilator window of a rapidly advancing car.

In accordance with the present invention, an elongated strip of metal is bent longitudinally to extend along the forward edge of the ventilator window in the form of a rearwardly open gutter while another portion of this strip extends the full length of the bottom edge of the window, the latter portion being bent transversely into the form of a closed tube extending from forward of the vertical pivot of the window to the rear edge of the window. The air being expelled by the rear and outer edge of an open ventilator window and the forward edge of the main window operates to draw water from the rear open end of this closed tubular portion drawing the water engaged by the gutter portion downwardly and thence outwardly at the rear entirely exterior of the car.

Referring to the drawings: 1 indicates the ordinary forward window of an automobile usually arranged to be raised or lowered for ventilation purposes. The ventilator window 2 is mounted on pivot rods 8 so as to pivot on a vertical line extending between these pivot points.

The embodiment of the present invention as herein illustrated comprises an elongated strip of sheet metal 3, bent upon itself transversely to form window engaging flanges 4—4 by means of which it is secured to the ventilator window 2 and also bent upon itself longitudinally to extend from a point substantially adjacent the top pivot 8 along the forward edge of the ventilator window to the bottom edge and thence along the bottom edge to the rear of the window. That portion of the strip 3 extending along the forward edge of the window 2 is further bent transversely to form an open gutter 5 which opens rearwardly. That portion of the strip which extends along the lower edge of the window is bent upon itself transversely as a continuation of the open gutter 5 to a point 6 slightly forward of the lower pivot 8 of the window. From this point to the rear edge of the window the strip 3 is bent upon itself transversely to form a tubular part 7, the forward portion of said tubular part merged gradually into the open gutter portion 5 as is shown in Fig. 2. The rear end of the tubular part 7 is open and it will be observed that in the open position of the ventilator window 2 this lower tubular portion 7 is directed outwardly with respect to the car while the forward open gutter portion 5 is positioned interiorly of the car with its open side outwardly directed.

In operation the force of the air drawn out of the car between the rear edge of the ventilator window 2 and the forward edge of the main window 1 operates to draw the rain water through the tube 7, thus drawing water from the gutter 3 and the forward inner corner of the window 2 into the tubular member and preventing the entrance of such water into the car.

The device may be readily modified as to means for attachment to particular windows and will be varied in its size and particular proportions as circumstances dictate but within the scope of the present invention as claimed.

Having thus fully described my invention, I claim:

Gutter for vertically pivoted wing type auto window comprising a strip bent longitudinally to conform in shape with the forward and bottom edges of the window with means for securing said strip to the window, that portion of the strip extending along the forward edge being bent transversely to form a rearwardly open gutter and merging into a tubularly bent closed gutter from a point forward of the pivot line of the window, said tubular form extending to the rear edge of the window and opening rearwardly.

RALPH V. MARTIN.

REFERENCES CITED

The following references are of record in the file of this patent:

UNITED STATES PATENTS

| Number | Name | Date |
| --- | --- | --- |
| 2,029,978 | Andrews, Jr. | Feb. 4, 1936 |
| 2,119,635 | Griffith | June 7, 1938 |
| 2,354,443 | Schirra | July 25, 1944 |